US011104588B1

(12) United States Patent
Ahmed et al.

(10) Patent No.: US 11,104,588 B1
(45) Date of Patent: Aug. 31, 2021

(54) SOLAR DISTILLATION SYSTEM WITH INTEGRATED COOLING AND CONTROLLER

(71) Applicant: Prince Mohammad Bin Fahd University, Dhahran (SA)

(72) Inventors: Faizan Ahmed, Dhahran (SA); Nassim Khaled, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 16/848,143

(22) Filed: Apr. 14, 2020

(51) Int. Cl.
| | |
|---|---|
| *C02F 1/14* | (2006.01) |
| *B01D 1/02* | (2006.01) |
| *B01D 3/00* | (2006.01) |
| *B01D 5/00* | (2006.01) |
| *F25B 27/00* | (2006.01) |
| *C02F 1/04* | (2006.01) |

(Continued)

(52) U.S. Cl.
CPC ............. *C02F 1/14* (2013.01); *B01D 1/0035* (2013.01); *B01D 1/02* (2013.01); *B01D 3/007* (2013.01); *B01D 5/006* (2013.01); *C02F 1/048* (2013.01); *F25B 27/005* (2013.01); *F25B 49/022* (2013.01); *F25B 41/385* (2021.01); *F25B 41/39* (2021.01)

(58) Field of Classification Search
CPC ........ B01D 1/0035; B01D 1/02; B01D 3/007; B01D 5/006; B01D 5/0066; C02F 1/14; C02F 1/16; C02F 1/048
See application file for complete search history.

(56) References Cited

U.S. PATENT DOCUMENTS

| 4,135,985 A | * | 1/1979 | La Rocca | ............ B01D 5/0066 202/176 |
| 4,235,679 A | * | 11/1980 | Swaidan | ................. F24S 10/60 202/234 |

(Continued)

FOREIGN PATENT DOCUMENTS

| CN | 100582022 C | 1/2010 |
| CN | 103739029 B | 5/2015 |

(Continued)

OTHER PUBLICATIONS

Juan D. Gil, et al., "An IoT based Control System for a Solar Membrane Distillation Plant used for Greenhouse Irrigation", Global IoT Summit (GLOTS), Jun. 17-21, 2019, 10 pages.

(Continued)

*Primary Examiner* — Jonathan Luke Pilcher
(74) *Attorney, Agent, or Firm* — Oblon, McClelland, Maier & Neustadt, L.L.P.

(57) ABSTRACT

A solar distillation system for producing a distillate and providing cooling for a structure or appliance, and a method of using the system to produce a distillate and cool a structure or appliance. The system includes a distillate cooling coil, a secondary cooling coil, an expansion valve which is capable of controlling an amount of a coolant that flows through each of the coils. The system also includes a compressor, a plurality of sensors including a temperature sensor and a distillate flow sensor, and a controller which receives input from the sensors and controls the activity of the compressor and expansion valve. The system is capable of producing distillate at night in the absence of solar radiation.

18 Claims, 2 Drawing Sheets

(51) Int. Cl.
*F25B 49/02* (2006.01)
*B01D 1/00* (2006.01)
*F25B 41/39* (2021.01)
*F25B 41/385* (2021.01)

(56) References Cited

U.S. PATENT DOCUMENTS

| | | | | |
|---|---|---|---|---|
| 4,952,290 | A * | 8/1990 | Carnarius | B01D 3/10 |
| | | | | 204/237 |
| 5,053,110 | A * | 10/1991 | Deutsch | B01D 5/0066 |
| | | | | 202/176 |
| 5,248,394 | A * | 9/1993 | Schlesinger | C02F 1/04 |
| | | | | 202/205 |
| 10,093,552 | B2 * | 10/2018 | Lee | H02S 40/44 |
| 10,343,119 | B2 | 7/2019 | Shudo | |
| 10,829,913 | B1 * | 11/2020 | Ahmed | B01D 1/30 |
| 10,926,223 | B2 * | 2/2021 | Al-Amri | B01D 5/006 |
| 2017/0036140 | A1 * | 2/2017 | Enzenhofer | C02F 1/041 |

FOREIGN PATENT DOCUMENTS

| | | |
|---|---|---|
| CN | 207361824 U | 5/2018 |
| CN | 104671311 B | 7/2018 |

OTHER PUBLICATIONS

R. Porrazzo, et al., "A neural network-based optimizing control system for a seawater-desalination solar-powered membrane distillation unit", Computers & Chemical Engineering, vol. 54, Jul. 11, 2013, pp. 79-96 (Abstract only).

Z.M. Omara, et al., "Hybrid of solar dish concentrator, new boiler and simple solar collector for brackish water desalination", Desalination, vol. 326, Oct. 1, 2013, pp. 62-68 (Abstract only).

Juan D. Gil, et al., "A Multivariable Controller for the Start-up Procedure of a Solar Membrane Distillation Facility", IFAC-PAPERSONLINE, vol. 51, Issue 4, 2018, pp. 376-381.

Ke Xu, et al., "A review of high-temperature selective absorbing coatings for solar thermal applications", Journal of Materiomics, vol. 6, 2020, pp. 167-182.

* cited by examiner

SOLAR DISTILLATION SYSTEM WITH INTEGRATED COOLING AND CONTROLLER

BACKGROUND OF THE INVENTION

Field of the Invention

The present disclosure relates to a solar distillation system.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Fresh water is a critical resource for a wide variety of human activity. Demand for fresh water is exacerbated by increasing population growth, desertification, and rising global temperatures. In arid regions, particularly hot arid regions, fresh water is scarce, but solar energy is abundant. Further, such regions may have ready access to non-fresh water resources such as seawater. Because of this, the use of solar radiation for water purification is very attractive in these regions.

Regions where solar water purification is most attractive typically have a great need for cooling or refrigeration as well. A solar water purification system with integrated cooling or refrigeration capabilities would be advantageous over separate systems.

While solar water purification and solar cooling or refrigeration systems operate well during daytime when exposed to high levels of sunlight, the need for cooling or fresh water do not disappear at sunset. An integrated system that can continue to provide fresh water and cooling during hours, days, or weeks of reduced solar radiation (such as night, cloudy or rainy days, or winter) could better address the needs in such hot arid regions.

In view of the forgoing, one object of the present disclosure is to provide a solar distillation system which also provides cooling for a structure or appliance, the system comprising an expansion valve, a compressor, temperature sensors, a distillate flow sensor, and a controller which receives input from the temperature sensors and the distillate flow sensors and provides output to control the activity of the compressor and expansion valve.

SUMMARY OF THE INVENTION

The present disclosure relates to a solar distillation system for producing a distillate, comprising:

a solar still comprising: a heat-absorbing solution, a heat-absorbing solution basin, a transparent, inclined top cover attached to the heat-absorbing solution basin, a distillate collector, a distillate flow sensor connected to the distillate collector, a coolant, a heat exchange coil located in the heat-absorbing solution basin comprising a heat exchange coil inlet and heat exchange coil outlet, a distillation cooling coil located in or disposed on the transparent, inclined top cover comprising a distillation cooling coil inlet and a distillation cooling coil outlet;

an expansion valve comprising: an expansion valve inlet connected to and located downstream of the heat exchange coil outlet, an expansion valve distillation cooling coil outlet connected to and located upstream of the distillation cooling coil inlet, and an expansion valve secondary cooling coil outlet;

a secondary cooling coil comprising a secondary cooling coil inlet connected to and located downstream of the expansion valve secondary cooling coil outlet and a secondary cooling coil outlet;

a compressor comprising a compressor inlet connected to and located downstream of the distillation cooling coil outlet and the secondary cooling coil outlet and a compressor outlet connected to and located upstream of the heat exchange coil inlet;

a plurality of temperature sensors; and a controller connected to the plurality of temperature sensors, the distillate flow sensor, the compressor, and the expansion valve;

wherein the heat exchange coil, the expansion valve, the distillation cooling coil, the secondary cooling coil, and the compressor are fluidly connected such that the coolant flows from the compressor through the heat exchange coil to the expansion valve where it is flowed through either the distillation cooling coil back to the compressor or the secondary cooling coil back to the compressor without the coolant mixing with the distillate or the heat-absorbing solution; and wherein the controller provides outputs to control an amount of coolant that is flowed through the distillation cooling coil to an amount of coolant that is flowed through the secondary cooling coil and an activity of the compressor.

In some embodiments, the heat-absorbing solution is a saline water.

In some embodiments, the distillate is freshwater.

In some embodiments, the expansion valve is a three-way valve.

In some embodiments, the three-way valve is capable of regulating the amount of coolant that is flowed through the secondary cooling coil and the amount of coolant that is flowed through the distillation cooling coil.

In some embodiments, the controller controls the amount of coolant that is flowed through the distillation cooling coil to the amount of coolant that is flowed through the secondary cooling coil and an activity of the compressor by operating the action of the expansion valve.

In some embodiments, the controller controls the amount of coolant that is flowed through the distillation cooling coil to the amount of coolant that is flowed through the secondary cooling coil and an activity of the compressor by operating the action of the compressor.

In some embodiments, the system further comprises ambient weather sensors which provide current weather inputs to the controller.

In some embodiments, the controller is capable of retaining a history of inputs and outputs.

In some embodiments, the controller is capable of predicting future outputs based on the history of inputs and outputs.

In some embodiments, the secondary cooling coil is configured to provide cooling for a structure or appliance.

In some embodiments, the structure or appliance is equipped with a temperature sensor connected to the controller.

In some embodiments, the controller is capable of providing the structure or appliance with a structure temperature or appliance temperature that is selected by the input of a structure temperature setpoint or appliance temperature setpoint.

In some embodiments, the system is capable of maintaining the structure temperature or appliance temperature to within 5° C. of the structure temperature setpoint or appliance temperature setpoint.

In some embodiments, the system produces distillate at a distillate production rate during hours of low solar heat input and/or nighttime operation which is 50 to 100% of a distillate production rate during hours of standard solar heat input and/or daytime.

In some embodiments, the system produces distillate at a distillate production rate during weeks of low solar heat input and/or wintertime operation which is 50 to 100% of a distillate production rate during weeks of standard solar heat input and/or summertime.

The present disclosure also relates to a method of producing a distillate using the system described above, the method comprising exposing the heat-absorbing solution to sunlight and collecting the distillate.

In some embodiments, the method also provides cooling for a structure or appliance.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION OF THE INVENTION

In the following description, it is understood that other embodiments may be utilized and structural and operational changes may be made without departure from the scope of the present embodiments disclosed herein.

Definitions

As used herein, the terms "optional" or "optionally" means that the subsequently described event(s) can or cannot occur or the subsequently described component(s) may or may not be present (e.g., 0 wt. %).

Figure 1:
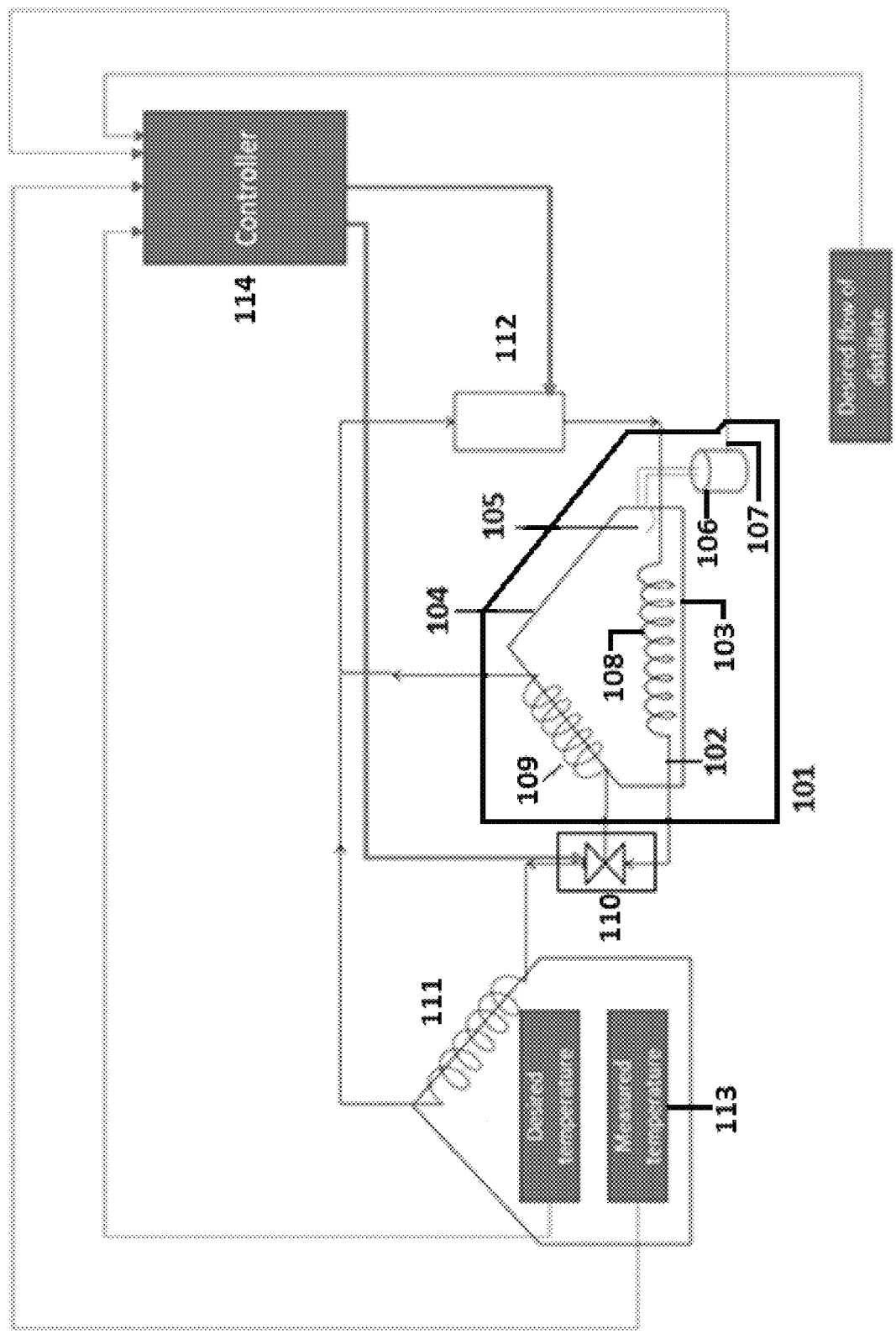
FIG. 1 is a depiction of the solar distillation system.
Figure 2:
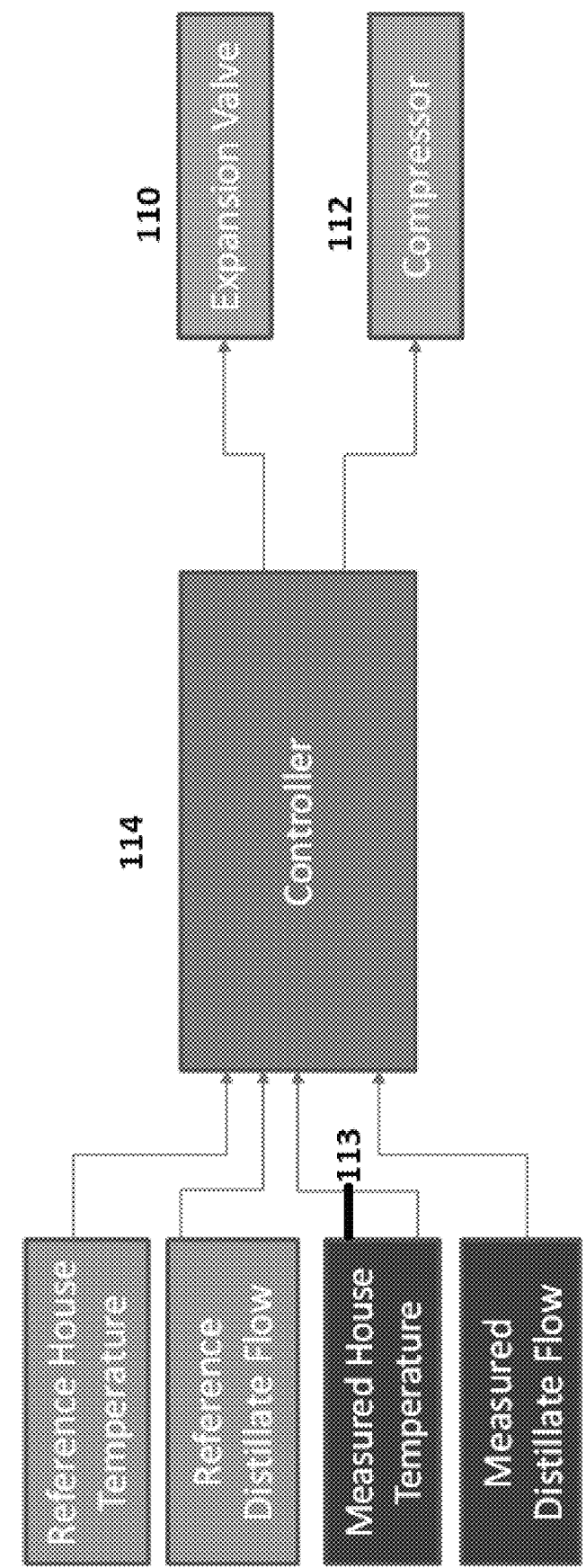
FIG. 2 is a diagram of the controller inputs and outputs.

According to a first aspect, the present disclosure relates to a solar distillation system for producing a distillate. This solar distillation system is depicted in FIG. 1. The system comprises a solar still (101), an expansion valve (110), a secondary cooling coil (111), a compressor (112), one or more temperature sensors (113), and a controller (114).

The solar still (101) comprises a heat-absorbing solution (102), a heat-absorbing solution basin (103), a transparent, inclined top cover (104) attached to the heat-absorbing solution basin, a distillate collector (105), a distillate receptacle (106), a distillate flow sensor (107) connected to the distillate collector or the distillate receptacle, a coolant, a heat exchange coil (108) located in the heat-absorbing solution basin comprising a heat exchange coil inlet and heat exchange coil outlet, a distillation cooling coil (109) located in or disposed on the transparent, inclined top cover comprising a distillation cooling coil inlet and a distillation cooling coil outlet.

In some embodiments, the heat-absorbing solution is a saline water. As used herein, a "saline water" refers to a water or other aqueous solution having a salinity greater than or equal to 0.05 wt % dissolved salts. Examples of salts that may be present in the saline water include, but are not limited to, sodium salts, potassium salts, lithium salts, magnesium salts, calcium salts, strontium salts, ammonium salts, iron salts, chloride salts, bromide salts, iodide salts, fluoride salts, sulfate salts, hydrogen sulfate salts, phosphate salts, hydrogen phosphate salts, dihydrogen phosphate salts, carbonate salts, bicarbonate salts, sulfite salts, nitrate salts, acetate salts, and citrate salts. In some embodiments, the saline water is brackish water, seawater, or brine. As used in this disclosure, "brackish water" contains 0.05 to 3% by weight of dissolved salts, "seawater" contains 3 to 5% by weight of dissolved salts, and "brine" contains greater than 5% by weight of dissolved salts.

In some embodiments, the heat-absorbing solution comprises a corrosion inhibitor. As used herein, a "corrosion inhibitor" refers to a substance added to the heat-absorbing solution to prevent, slow the rate of, or lessen the degree of corrosion of metal which comes into contact with the heat-absorbing solution. In some embodiments, the corrosion inhibitor is added to the heat-absorbing solution while the heat-absorbing solution is in the heat-absorbing solution basin. In alternative embodiments, the corrosion inhibitor is added to the heat-absorbing solution before the heat-absorbing solution is in the heat-absorbing solution basin. Examples of corrosion inhibitors include benzoin, benzoin-(4-phenylthiosemicarbazone), benzyl-(4-phenylthiosemicarbazone), α-pyridoin, 2,2'-pyridil, salts of N-1-n-hexyl-phthalamate, salts of N-1-n-decyl-phthalamate, salts of N-1-n-tetradecyl-phthalamate, benzimidazole, 2-methylbenzimidazole, 2-aminobenzimidazole, 2-aminoethylbenzimidazole, 2-(2-pyridyl)benzimidazole, 2-hydroxybenzimidazole, 2-mercaptobenzimidazole, 1-benzylbenzimidazole, 1,2-dibenzylbenzimidazole, indole, 1H-benzotriazole, 1,2-benzothiazole, benzaldehyde, 4-amino-5-mercapto-1,2,4-triazole, 3-phenyl-4-amino-5-mercapto-1,2,4-triazole, 1,12-bis(1,2,4-triazolyl)dodecane, octyl alcohol, propargyl alcohol, piperidine, 2-methylpiperidine, 3-methylpiperidine, 4-methylpiperidine, 4-benzylpiperidine, 3,5-dimethylpiperidine, 2,6-dimethylpiperidine, 2-chloroaniline, 2-fluoroaniline, 2-methoxyaniline, 2-ethoxyaniline, 2-methylanniline, glycine, 2-(bis(2-aminoethyl)amino) acetic acid, cinnamaldehyde, benzalacetone, chalcone, 1,4-bis(2-pyridyl)-5H-pyridazino[4,5-b]indole, 3,5-bis(2-thienyl)-1,3,4-thiadiazole, 2-(undecyldimethyl-ammonio)butanol bromide, 2-(dodecyldimethyl-ammonio) butanol bromide, 2-(tridecyldimethyl-ammonio)butanol bromide, 2-(tetradecyldimethyl-ammonio)butanol bromide, 2-(pentadecyldimethyl-ammonio)butanol bromide, 2-hydroxy-1,4-naphthoquinone, gallic acid, α-D-glucose, tannic acid, 1-(2-pyridylazo)-2-naphthol, leucine, salts of N,N-diallyl-N-benzyl dodecyl ammonium cation, salts of N,N-diallyl-N'-formyl 1,6-hexanediammonium cation, N,N-dimethyl-N-benzyl dodecyl ammonium cation, salts of N,N-diallyl-N-propargyl-(12-N'-formylamino)-1-dodecyl ammonium cation, glutamic acid, methionine sulfoxide, methionine sulfone, creatine, N-phosphonomethylglycine, acetylcysteine, S-benzylcysteine, 2-(4(dimethylamino)benzylamino acetic acid, chlorotyrosine, bromotyrosine, iodotyrosine, dichlorotyrosine, dibromotyrosine, diiodotyrosine, chlorobromotyrosine, chlroroiodotyrosine, and bromoiodotyrosine.

In some embodiments, the heat-absorbing solution comprises a biocide. A biocide is a substance meant to prevent, destroy, deter, render harmless, or control an organism. Examples of biocides include algicides, fungicides, and bactericides. In some embodiments, the biocide is added to the heat-absorbing solution while the heat-absorbing solution is in the heat-absorbing solution basin. In alternative embodiments, the biocide is added to the heat-absorbing solution before the heat-absorbing solution is in the heat-absorbing solution basin.

In some embodiments, the biocide comprises an algicide. An algicide is a biocide meant to prevent, destroy, deter, render harmless, or control algae. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

In some embodiments, the biocide comprises a fungicide. A fungicide is a biocide meant to prevent, destroy, deter, render harmless, or control fungi. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

In some embodiments, the biocide comprises a bactericide. A bactericide is a biocide meant to prevent, destroy, deter, render harmless, or control bacteria. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

The heat-absorbing solution basin is configured to contain the heat-absorbing solution. In some embodiments, the heat-absorbing solution basin further comprises a heat-absorbing solution inlet and a heat-absorbing solution outlet. In some embodiments, the aforementioned heat-absorbing solution inlet is configured in a way such that the heat-absorbing solution may be introduced into the heat-absorbing solution basin. In some embodiments, the introduction of the heat-absorbing solution into the heat-absorbing solution basin through the heat-absorbing solution inlet is intermittent, that is, the heat-absorbing solution is not continuously introduced to the heat-absorbing solution basin. In alternative embodiments, the introduction of the heat-absorbing solution into the heat-absorbing solution basin is continuous. In some embodiments, the aforementioned heat-absorbing solution outlet is configured in a way such that the heat-absorbing solution may be removed from the heat-absorbing solution basin. The heat-absorbing solution outlet, for example may be placed at the bottom of the container or near the bottom on a side of the container to allow removal via draining or may be connected to a pipe extending into the portion of the heat-absorbing solution basin which contains the heat-absorbing solution to allow for removal via pumping. In some embodiments, the removal of the heat-absorbing solution from the heat-absorbing solution basin through the heat-absorbing solution outlet is intermittent, that is, the heat-absorbing solution is not continuously removed from the heat-absorbing solution basin. In alternative embodiments, the removal of the heat-absorbing solution from the heat-absorbing solution basin is continuous. In some embodiments, the heat-absorbing solution outlet is placed such that an entire volume of heat-absorbing solution present in the heat-absorbing solution basin may be removed from the heat-absorbing solution basin.

The heat-absorbing solution basin may be constructed from any suitable material known to one of ordinary skill in the art. In some embodiments, the heat-absorbing solution basin may be constructed from metal, plastic, or some combination of these. Examples of metals that may be used in the construction of the heat-absorbing solution basin include steel, stainless steel, titanium, aluminum, and the like Examples of plastics that may be used in the construction of the heat-absorbing solution include polyethylene, polypropylene, polyethylene terephthalate, polyamide, polystyrene, polyethersulfone, and the like. In some embodiments, the heat-absorbing solution basin further comprises a corrosion prevention system. Such a system is used to prevent corrosion of metal or metal-containing components. Examples of corrosion prevention systems include anticorrosion coatings, sacrificial electrodes, and impressed current cathodic protection systems. Anticorrosion coatings are coatings applied to a metal or metal-containing component which serve to protect said component from corrosion, typically when the metal is iron or steel. Examples of anticorrosion coatings include zinc (galvanized coating), aluminum (anodized coating), polymer coatings, ceramics, and paints. A sacrificial electrode is an electrode in electrical connection with the metal or metal-containing component to be protected which will preferentially corrode so as to remove an electrical driving force for corrosion, particularly galvanic corrosion. An impressed current cathodic protection system is a system which contains one or more electrodes and a power source designed to produce an electrical current which is designed to remove an electrical driving force for corrosion, particularly galvanic corrosion.

In some embodiments, the heat-absorbing solution and optionally the heat-absorbing solution basin act as a solar collector. As used herein a "solar collector" or "solar thermal collector" is a material or device which collects heat by absorbing or capturing solar radiation. Solar radiation is energy in the form of electromagnetic radiation from the infrared to the ultraviolet wavelengths. In some embodiments, the heat-absorbing solution basin is constructed of or coated with a material which has a transmittance of less than 50%, preferably less than 40%, preferably less than 30%, preferably less than 25%, preferably less than 20%, preferably less than 15%, preferably less than 10%, preferably less than 5%, preferably less than 1%. In some embodiments, the aforementioned transmittance is measured in the visible region, that is, the region of the electromagnetic spectrum between the wavelengths of about 400 to about 700. In some embodiments, the aforementioned transmittance is measured in the near-infrared region, that is, the region of the electromagnetic spectrum between the wavelengths of about 700 to about 1400 nm. In some embodiments, the aforementioned transmittance is measured in the region of about 1400 nm (1.4 μm) to about 8000 nm (8 μm). In some embodiments, an absorption aid material having such properties may be added to either the heat-absorbing solution, the heat-absorbing solution basin, or both to increase the total amount of energy absorbed by the heat-absorbing solution. Examples of such absorption aid materials include, but are not limited to, molecular dyes, inorganic nanomaterials, carbon nanomaterials, microspheres, and floating polymer shapes such as discs, spheres, or blocks. In some embodiments, the absorption aid material is dispersed in the heat-absorbing solution.

The heat-absorbing solution basin is preferably constructed to have a bottom that is black or colored to maximize solar rays. Selective absorption coatings such as intrinsic absorbers, semiconductor-metal tandem absorbers, multilayer interference stack absorbers, cermet absorbers, and textured surfaces may be used. In some embodiments, these selective absorption coatings are disposed upon the material from which the heat-absorbing solution basin is constructed. Alternatively, the selective absorption coatings may be integral with the bottom of the seat-absorbing solar basin. In some embodiments, the selective absorption coatings are disposed upon a substrate material which may be another material such as a polyolefin material, adhesive material, metal, or metal oxide.

In some embodiments, the bottom of the heat-absorbing solution basin that faces the transparent, inclined top cover is made of or coated with an intrinsic absorber. Examples of intrinsic absorbers include, but are not limited to copper (I) sulfide ($Cu_2S$), hafnium carbide, molybdenum oxide ($MoO_3$), indium oxide, zirconium nitride, and $Si_3N_4/ZrB_2$.

In some embodiments, the bottom of the heat-absorbing solution basin that faces the transparent, inclined top cover is made of or coated with a semiconductor-metal tandem absorber. Examples of semiconductors that may be used in semiconductor-metal tandem absorbers include, but are not limited to silicon, germanium, lead sulfide, zirconium oxide, titanium oxide, zirconium nitride, and titanium nitride. In some embodiments in which a semiconductor absorber is used as described above, an anti-reflection layer is disposed on the semiconductor absorber. In a semiconductor-metal tandem absorber, the semiconductor is present as a layer disposed upon a metal layer. Examples of metals that may be used with semiconductor-metal tandem absorbers include, but are not limited to nickel, molybdenum, aluminum, titanium, silver, tungsten, chromium, platinum, gold, and copper.

In some embodiments, the bottom of the heat-absorbing solution basin that faces the transparent, inclined top cover is made of or coated with a multilayer interference stack absorber. As used herein, a "multilayer interference stack absorber" refers to a coating comprising multiple layers of semiconductor absorber or intrinsic absorber separated by at least one semitransparent layer of metal. The semiconductor absorber layers may be constructed of semiconductor absorbers as described above. The intrinsic absorber layers may be constructed of intrinsic absorbers as described above. The semiconductor absorber layers or intrinsic absorber layers may be collectively referred to as "absorber layers". An example of the layer-by-layer structure of a multilayer interference stack absorber is a first absorber layer, a semitransparent metal layer disposed upon the first absorber layer, and a second absorber layer disposed upon the semitransparent metal layer. In some embodiments, the multilayer interference stack absorber further comprises an antireflection coating disposed upon a final absorber layer, the antireflection coating forming the surface of the multilayer interference stack. In some embodiments, the multilayer interference stack comprises at least 2, preferably at least 3, preferably at least 4, preferably at least 5, preferably at least 6, preferably at least 7, preferably at least 8, preferably at least 9, preferably at least 10 absorber layers. While no theoretical limit to the number of absorber layers exits, typical examples of multilayer interference stacks comprise 2 to 25, preferably 4 to 22, preferably 7 to 20, preferably 10 to 18 absorber layers. In some embodiments, the first absorber layer is disposed on a substrate or the material of the heat-absorbing solution basin. In alternative embodiments, the first absorber layer is disposed on a reflective layer. In some embodiments, the absorber layers have identical thicknesses. In alternative embodiments, the absorber layers do not have identical thicknesses. In some embodiments, the metal layers have identical thicknesses. In alternative embodiments, the metal layers do not have identical thicknesses. Examples of metals that may be used with multilayer interference stack absorbers include, but are not limited to nickel, molybdenum, aluminum, titanium, silver, tungsten, chromium, platinum, gold, and copper.

In some embodiments, the bottom of the heat-absorbing solution basin that faces the transparent, inclined top cover is made of or coated with a cermet absorber. As used herein, "cermet absorber" refers to a material comprising metal particles, preferably nanoscopic particles, dispersed in a ceramic matrix. The metal particles in a cermet absorber act as infrared reflectors and to create boundaries located at the interface of the metal particles and the ceramic matrix where solar radiation is scattered. This scattering serves to increase the path length of the radiation through the cermet material, increasing the overall adsorption of the radiation by the material. Examples of materials that may be used as the ceramic matrix include, but are not limited to lead sulfide, zirconium oxide, titanium oxide, zirconium nitride, titanium nitride, copper (I) sulfide ($Cu_2S$), hafnium carbide, molybdenum oxide ($MoO_3$), indium oxide, zirconium nitride, silicon nitride, alumina, aluminum nitride, silica, aluminosilicate materials such as andalusite, kyanite, and sillimanite, titanium carbide, and aluminum oxynitride. Examples of metals that may be used as the metal particles include, but are not limited to nickel, molybdenum, aluminum, titanium, silver, tungsten, chromium, platinum, gold, and copper.

In some embodiments, the cermet absorber is a single-layer absorber comprising a single cermet layer. The single-layer absorber may further comprise additional layers such as a substrate layer, reflective layer, or antireflective coating layer. In alternative embodiments, the cermet absorber is a multi-stack absorber comprising more than one cermet layers. The cermet layers may be adjacent or may be separated by a semitransparent metal layer as described above. The multi-stack absorber may further comprise additional layers such as a substrate layer, reflective layer, or antireflective coating layer. In some embodiments, the cermet absorber is a multi-stack absorber having an anti-reflection top layer, followed by a low metal volume fraction cermet layer, a high metal volume fraction cermet layer, an infrared reflective layer, and a substrate layer. The cermet layers preferably contain tungsten and/or aluminum molybdenum aluminum oxide materials and optionally, metal particles such as nickel, molybdenum, aluminum, titanium, silver, tungsten, chromium, platinum, gold, and copper. [Xu, K., et. al., Journal of Materiomics, 2020, 6, 167-182]

In some embodiments, the heat-absorbing solution basin has at least three, preferably at least four vertical walls separating the bottom of the basin from the transparent, inclined top cover. In some embodiments, each of the walls has a parabolic shape and is highly reflective. In some embodiments, the walls are constructed of metal. Preferably, this metal is highly polished. In this embodiment, indirect solar arrays can be further concentrated and directed into the seat-absorbing solution. In some embodiments, the walls are highly reflective only on the side of the wall facing the interior of the heat-absorbing solution basin. In such embodiments, the side of the wall facing the exterior of the heat-absorbing solution basin is transparent. In alternative embodiments, the walls are transparent on both sides.

The transparent, inclined top cover acts to cover the heat-absorbing solution basin and allows for the transmission of solar irradiation to the heat-absorbing solution. In some embodiments, the transparent, inclined top cover is constructed from a material which has a transmittance of greater than 70%, preferably greater than 75%, preferably greater than 80%, preferably greater than 85%, preferably greater than 90%, preferably greater than 95%, preferably greater than 99%. In some embodiments, the aforementioned transmittance is measured in the visible region, that is, the region of the electromagnetic spectrum between the wavelengths of about 400 to about 700. In some embodiments, the aforementioned transmittance is measured in the near-infrared region, that is, the region of the electromagnetic spectrum between the wavelengths of about 700 to about 1400 nm. In some embodiments, the aforementioned transmittance is measured in the region of about 1400 nm (1.4 μm) to about 8000 nm (8 μm). Examples of such materials include glass, ceramics such as alumina, yttria, yttria alumina garnet, spinel ($MgAl_2O_4$), vanadium oxide (both $VO_2$ and $V_2O_5$), and aluminum oxynitride spinel, and polymers such as low density polyethylene (LDPE), high density polyethylene (HDPE), polymethylmethacrylate (PMMA, acrylic), polylactic acid, polycarbonate, polypropylene, and polyethylene terephthalate. In some embodiments, the entirety of the transparent, inclined top cover is constructed of the aforementioned materials. In some embodiments, the transparent, inclined top cover is constructed of both transparent and non-transparent materials. In such embodiments, the transparent, inclined top cover is preferably at least 51%, preferably at least 60%, preferably at least 65%, preferably at least 70%, preferably at least 75%, preferably at least 80% transparent material by volume based on a total volume of the transparent, inclined top cover.

In some embodiments, the transparent, inclined top cover fits over or around the heat-absorbing solution basin. In some embodiments, the transparent, inclined top cover is attached to or disposed upon the heat-absorbing solution basin. In some embodiments, the transparent, inclined top cover is attached to or is disposed upon the heat-absorbing solution basin in such a way as to prevent the mixing of a distillate vapor generated from the heat-absorbing solution with ambient air. In some embodiments, this prevention accomplished by a seal between the heat-absorbing solution basin and the transparent, inclined top cover. In some embodiments, the seal is watertight. In some embodiments, the seal is airtight. Such a seal may be created by a material known those of ordinary skill in the art, for example rubber, neoprene, silicone, polytetrafluoroethylene, felt, and fiberglass. In some embodiments, the prevention is accomplished by vertical portions of the transparent, inclined top cover which extend outside of the walls of the heat-absorbing solution basin past the top of said walls and create a physical barrier to air or vapor flow, but do not create a seal as described above. In some embodiments, the transparent, inclined top cover is permanently attached to the heat-absorbing solution basin. In alternative embodiments, the transparent, inclined top cover is removable. The ability to remove the transparent, inclined top cover may be advantageous for maintenance of the system such as cleaning or repair. In some embodiments, the transparent, inclined top cover is inclined so as to direct the distillate to the distillate collector. In some embodiments, the incline is at least 0.75°, preferably at least 1.5°, preferably at least 3°, preferably at least 5°, preferably greater than 7.5°, preferably greater than 10°, preferably greater than 12.5°, preferably greater than 15°. In some embodiments, the incline is at least 1%, preferably at least 2%, preferably at least 3%, preferably at least 5%, preferably at least 7.5%, preferably at least 10%, preferably at least 15%, preferably at least 20%. In some embodiments, the transparent, inclined top cover directs the distillate from the distillate cooling coil to the distillate collector.

In another embodiment of the invention the transparent, inclined top cover is made of a transparent polymeric or glass material in the shape of a dome or in the shape of a truncated or shortened parabolic shape. The apex of the dome extends outwardly from the basin. In some embodiments, a plurality of lenses are pitched, embossed or adhered onto the outer surface of the dome. These lenses may be simple lenses, cylindrical lenses, aspheric lenses, lenticular lenses, bifocal lenses, and Fresnel lenses. The placement of a plurality of such lenses permits focusing of solar rays from various angles as the sun changes its position in the sky. For a basin having an open area of one square meter, it is preferred that a lens is present in each 10 cm$^2$ section, preferably a section measuring 10, 20, 30, 40, 50 or 100 cm$^2$. In preferred embodiments, the lenses are Fresnel lenses.

In some embodiments, the distillate collector collects a liquid distillate. In some embodiments, the distillate collector is attached to or disposed upon the heat-absorbing solution basin. In some embodiments, the distillate collector is attached to or disposed upon the walls of the heat-absorbing solution basin. In alternative embodiments, the distillate collector is attached to or disposed upon the transparent, inclined top cover. In some embodiments, the distillate collector is positioned such that the liquid distillate is directed into the distillate collector by the incline of the transparent, inclined top cover. In some embodiments, the distillate collector is positioned such that liquid distillate flows or is otherwise transferred from the distillation cooling coil to the distillate collector. In some embodiments, the distillate collector prevents the heat-absorbing solution from entering the distillate collector. In some embodiments, the distillate collector is positioned such that the heat-absorbing solution cannot enter the distillate collector. In preferred embodiments, the distillate collector is positioned above a maximum level of heat-absorbing solution present in the heat-absorbing solution basin. In some embodiments, the distillate collector has a trough shape, half-pipe shape, V-shape, U-shape, or other similar shape as a cross-section with an open portion positioned at the top and a solid portion positioned at the bottom. This shape and orientation allows distillate to flow or otherwise be transferred from the transparent, inclined top cover into the distillate collector through the open top portion. Additionally, the side portions of the distillate collector serve to prevent the heat-absorbing solution from entering the distillate collector through the side of the distillate collector. In some embodiments, the distillate collector extends at least ⅛", preferably at least ¼", preferably at least ⅜", preferably at least ½", preferably at least ⅝", preferably at least ¾", preferably at least 1" into the area defined by the heat-absorbing solution basin. In some embodiments, the distillate collector is present on all of the sides of the heat-absorbing solution basin or transparent, inclined cover. In alternative embodiments, the distillate collector is present on only 1, alternatively only 2, alternatively only 3 of the sides of the heat-absorbing solution basin or transparent, inclined cover. The distillate collector is equipped with a distillate flow sensor which measures the liquid distillate collected by the distillate collector. In some embodiments, the distillate collector directs the distillate into the distillate receptacle.

In some embodiments, the distillate receptacle is a container constructed from a metal such as stainless steel, aluminum, copper, galvanized steel, or other metal known to those of ordinary skill in the art or a plastic such as low density polyethylene, high density polyethylene, polypropylene, polycarbonate, acrylic, or other plastic known to those of ordinary skill in the art. In some embodiments, the distillate receptacle has a distillate capacity of at least 25 L, preferably at least 50 L, preferably at least 75 L, preferably at least 100 L, preferably at least 125 L, preferably at least 150 L, preferably at least 175 L, preferably at least 200 L. In some embodiments, the distillate receptacle is equipped with a distillate receptacle outlet through which the distillate collected in the distillate receptacle may be drained from the distillate receptacle. In preferred embodiments, the distillate receptacle outlet is a drain valve. In some embodiments, the distillate receptacle is equipped with a pump for pumping the distillate out of the distillate receptacle.

In some embodiments, the distillate is freshwater. As used herein, "freshwater" refers to water which has a salinity of less than 0.05 wt % dissolved salts, preferably less than 0.04 wt %, preferably less than 003 wt %, preferably less than 0.02 wt %, preferably less than 0.01 wt % dissolved salts.

In some embodiments, the coolant is a liquid coolant. Examples of liquid coolants include, but are not limited to, water, polyalkylene glycols such as polyethylene glycol and polypropylene glycol, mineral oil, polyphenyl ether, silicone oils, fluorocarbon oils, ethylene glycol, propylene glycol, and mixtures of these. In some embodiments, the coolant is a gas coolant. Examples of gas coolants include, but are not limited to, air, helium, carbon dioxide, sulfur hexafluoride, nitrogen, and argon. In some embodiments, the coolant is a two-phase coolant. As used herein, a two-phase coolant refers to coolants that are used in both liquid form and gas form in the same coolant system or coolant loop. Two-phase coolants may take advantage of a latent heat or enthalpy associated with a phase change in addition to a non-phase-change heat capacity. Examples of two-phase coolants include, but are not limited to, ammonia, sulfur dioxide, halomethanes such as R-12 and R-22, and water/steam.

The heat exchange coil, the expansion valve, the distillation cooling coil, the secondary cooling coil, and the compressor are fluidly connected such that the coolant flows from the compressor through the heat exchange coil to the expansion valve where it is flowed through either the distillation cooling coil back to the compressor or the secondary cooling coil back to the compressor without the coolant mixing with the distillate or the heat-absorbing solution. In some embodiments, the solar distillation system for producing a distillate further comprises a coolant bypass. In some embodiments, the coolant bypass comprises a coolant bypass inlet connected to and located downstream of the expansion valve. In alternative embodiments, the coolant bypass is connected to and located upstream of the expansion valve. In such embodiments, a coolant bypass valve may be present to control an amount of coolant flowed through the coolant bypass relative to the amount of coolant flowed to the expansion valve. In some embodiments, the coolant bypass comprises a coolant bypass outlet connected to and located upstream of the compressor. In some embodiments, the coolant may optionally flow through the coolant bypass back to the compressor instead of flowing through either the distillation cooling coil or the secondary cooling coil. In some embodiments, the coolant flows through the coolant bypass without the coolant mixing with the distillate or the heat-absorbing solution.

The heat exchange coil located in the heat-absorbing solution basin comprises a heat exchange coil inlet and a heat exchange coil outlet. The coolant flows through the heat exchange coil from the inlet to the outlet. In some embodiments, the coolant that flows into the heat exchange coil has a higher temperature than the coolant that flows out of the heat exchange coil through the outlet. In some embodiments, the heat exchange coil exchanges heat from the coolant to the heat-absorbing solution. In some embodiments, this heat exchange simultaneously heats the heat-absorbing solution and cools the coolant. In some embodiments, this heat exchange facilitates the generation of a distillate vapor from the heat-absorbing solution.

The distillation cooling coil located in or disposed on the transparent, inclined top cover comprises a distillation cooling coil inlet and a distillation cooling coil outlet. The coolant flows through the distillation cooling coil from the inlet to the outlet. In some embodiments, the coolant that flows into the distillation cooling coil has a lower temperature than the coolant that flows out of the distillation cooling coil through the outlet. In some embodiments, the distillation cooling coil exchanges heat from the distillate vapor to the coolant. In some embodiments, this heat exchange simultaneously heats the coolant and cools the distillate vapor. In some embodiments, this heat exchange facilitates the transition from distillate vapor to distillate liquid.

In some embodiments, the solar distillation system further comprises additional solar collectors. In some embodiments, the additional solar collectors may be designed to exploit, configured to exploit, or capable of exploiting optical or other properties of sunlight including, but not limited to, absorption, reflection, or refraction to maximize the harnessing of usable energy from sunlight. In some embodiments, the additional solar collectors are disposed upon the heat-absorbing solution basin. In some embodiments, the additional solar collectors are connected to the heat-absorbing solution basin. In some embodiments, the heat-absorbing solution contacts the additional solar collectors. In some embodiments, the heat-absorbing solution is flowed through the additional solar collectors. In some embodiments, the additional solar collectors increase the amount of solar energy collected by the solar distillation system by increasing the surface are of the solar distillation system exposed to solar radiation. One non-limiting example of additional solar collectors is a flat-plate collector. Such a flat-plate collector may comprise dark flat-plate absorber plates, a transparent or glazing cover that reduces heat loses, heat-transport fluid or heating fluid, recuperating tubes, heat insulating, and other suitable auxiliaries. In some embodiments, the recuperating tubes may be fluidly connected to an additional collector heat exchange tube in contact with or disposed upon the heat-absorbing solution basin. This flat-plate collector operates by the dark flat-plate absorber plates absorbing solar radiation, heating the heat-transport fluid as it flows through the recuperating tubes by absorbing heat from the dark flat-plate absorbers, flowing the heat-transport fluid to the additional collector heat exchange tube, and transferring heat from the heat-transport fluid to the heat-absorbing solution. In another non-limiting example of additional solar collectors, the flat plate collector comprises dark flat-plate absorber plates, a transparent or glazing cover that reduces heat loses, recuperating tubes, heat insulating, and other suitable auxiliaries as before, but lacking the heat-transport fluid or heating fluid. In this example, the recuperating tubes are fluidly connected to the heat-absorbing solution basin and the heat-absorbing solution is pumped through the solar collectors to absorb solar heat.

In some embodiments the solar distillation system further comprises solar concentrators. In some embodiments, the solar concentrators may be designed to exploit, configured to exploit, or capable of exploiting optical or other properties of sunlight including, but not limited to reflection or refraction, but excluding absorption, to maximize the harnessing of usable energy from sunlight. Examples of solar concentrators include mirrors or other reflective surfaces and lenses. In some embodiments, the solar concentrators are positioned to reflect, refract, or otherwise direct sunlight from an area where incident sunlight would not transfer solar energy to the heat-absorbing solution, solar collectors, or both to the heat-absorbing solution, solar collectors, or both. In this way, solar energy from a larger area may be collected for use by the heat-absorbing solution without the heat-absorbing solution being present in that area.

The secondary cooling coil comprises a secondary cooling coil inlet connected to and located downstream of the expansion valve secondary cooling coil outlet and a secondary cooling coil outlet. In some embodiments, the secondary cooling coil is configured to provide cooling to a structure or appliance. Examples of structures or appliances which may have cooling provided by the secondary cooling coil include refrigerators, air conditioners, heat pumps, residences, schools, and commercial buildings such as offices, warehouses, and retail stores.

The expansion valve comprises an expansion valve inlet, an expansion valve distillation cooling coil outlet, and an expansion valve secondary cooling coil outlet. As used herein, an "expansion valve" or "thermal expansion valve" (EV, TEV, TXV or TX valve) refers to a valve component that controls flow in the system and are often generically referred to as "metering devices". Flow, control, or metering, is typically accomplished by use of a temperature sensing bulb, filled with a similar gas as in the system that causes the valve to open against the spring pressure in the valve body as the temperature on the bulb increases or by electronic actuation of a flow restriction mechanism linked to both a temperature sensor and a controller. In terms of the current invention, either mechanism may be used. In preferred embodiments, the expansion valve is operated by electronic actuation controlled by the controller. Expansion valves are often included in refrigeration or cooling systems as a means of increasing the efficiency. Typically, expansion valves can handle a total coolant flowrate of 5 to 500 kg/hour, 15 to 450 kg/hour, preferably 25 to 400 kg/hour, preferably 30 to 350 kg/hour, preferably 40 to 300 kg/hour, preferably 50 to 250 kg/hour. In some embodiments, the total coolant flowrate includes flow through the expansion valve to the distillation cooling coil and the secondary cooling coil. In alternative embodiments, the total coolant flowrate includes flow through the expansion valve to the distillation cooling coil, the secondary cooling coil, and the coolant bypass.

In one embodiment, the compressor of the solar distillation system produces the coolant as a high pressure liquid. Generally, this high pressure liquid coolant enters the expansion valve where the expansion valve allows a portion to flow. The expansion valve may have sensing bulbs or temperature sensors connected to and located downstream of the distillation cooling coil outlet and/or the secondary cooling coil outlet. These sensing bulbs give temperature readings to the expansion valve and/or the controller to adjust the flow of the fluid. The expansion of the high pressure coolant lowers the pressure of the coolant. In some embodiments, the expansion of the high pressure coolant lowers the temperature of the coolant. In some embodiments, a portion of the high pressure coolant is converted from a liquid to a gas by the expansion. In some embodiments, the action of the expansion valve adjusts the amount of cooling (measured for example, in BTU) that is delivered to the structure or appliance and/or the distillation cooling coil.

In some embodiments, the expansion valve inlet is connected to and located downstream of the heat exchange coil outlet. In some embodiments, the expansion valve distillation cooling coil outlet is connected to and located upstream of the distillation cooling coil inlet. In some embodiments, the expansion valve is a three-way valve. In some embodiments, the three-way valve is capable of regulating the amount of coolant that is flowed through the secondary cooling coil and the amount of coolant that is flowed through the distillation cooling coil. In some embodiments, the three-way valve is controlled by the controller. The amount of coolant that is flowed through the distillation coil may have an effect on the operation of the solar still. In some embodiments, the amount of coolant that is flowed through the distillation coil affects the rate at which the solar still produced distillate. The amount of coolant that is flowed through the secondary cooling coil may have an effect on the temperature of a structure or appliance cooled by the secondary cooling coil. In alternative embodiments, the expansion valve is a four-way valve. In such embodiments, the four-way valve is capable of regulating the amount of coolant that is flowed through the secondary cooling coil, the amount of coolant that is flowed through the distillation cooling coil, and the amount of coolant that is flowed through the coolant bypass.

The compressor comprises a compressor inlet connected to and located downstream of the distillation cooling coil outlet and the secondary cooling coil outlet and a compressor outlet connected to and located upstream of the heat exchange coil inlet. In some embodiments, the compressor inlet is connected to and located downstream of the coolant bypass outlet. In some embodiments, the action of the compressor heats the coolant. In some embodiments, the compressor compresses a gas coolant. In some embodiments, the compressor compresses a two-phase coolant. In some embodiments, the two-phase coolant is subjected to a phase change from gas to liquid due to being compressed by the compressor. In some embodiments, the compressor is a positive displacement compressor. A positive displacement compressor is one which compresses a gas by the displacement of a mechanical apparatus that reduces the volume the gas is able to occupy. Examples of positive displacement compressors include, but are not limited to reciprocating compressors, rotary screw compressors, rotary vane compressors, rolling piston compressors, scroll compressors, liquid ring compressors, and diaphragm compressors.

The system components described above may be directly connected or fluidly connected to one another, for example, by connecting pipes without intervening components. In addition valves may be disposed in a variety of ways, for example, between portions of connecting pipes, or for example, integrally to any additional or other system components. Depending on the size of the solar distillation system described herein, the internal or external diameters of the connecting pipes and valves may have a variable range that depends upon the size of the system and/or a desired distillate production rate and/or a desired amount of cooling provided to a structure or appliance. Typical sizes for pipes connecting the expansion valve to the secondary cooling coil, connecting the expansion valve to the distillation cooling coil, and/or the coolant bypass line are 5/8", 3/4", 7/8", 1", 1 1/8", 1 1/4", 1 3/8", 1 1/2", 1 5/8", 1 3/4", 1 7/8", 2", 2 1/8", 2 1/4", 2 3/8", and 2 1/2" measured as an inner or outer diameter. These pipes may be referred to as "post-expansion valve pipes" due to their position downstream of the expansion valve but upstream of the compressor. Typical sizes for pipes connecting the secondary tooling coil to the compressor, the distillation cooling coil to the compressor, the compressor to the heat exchange coil, and/or the heat exchange coil to the expansion valve are 5/16", 3/8", 1/2", 5/8", 3/4", 7/8", 1", 1 1/8", and 1 1/4" measured as an inner or outer diameter. These pipes may be referred to as "pre-expansion valve pipes" due to their position downstream of the compressor but upstream of the expansion valve. In some embodiments, a ratio of the sizes of post-expansion valve pipes to the sizes of pre-expansion valve pipes is 1:1 to 5:1, preferably 1.25:1 to 4:1, preferably 1.5:1 to 3:1, preferably 1.75:1 to 2.5:1, preferably 1.9:1 to 2.25:1, preferably 2:1. In embodiments that use a two-phase coolant, the ratio of the sizes of post-expansion valve pipes to the sizes of pre-expansion valve pipes is 1.5:1 to 3:1, preferably 1.75:1 to 2.5:1, preferably 1.9:1 to 2.25:1, preferably 2:1. In general, the aforementioned pipes may be any material known to those of ordinary skill in the art for use with coolant as described above. Examples of such materials include, but are not limited to copper, galvanized steel, black (non-galvanized) steel, stainless steel, polyvinylchloride (PVC), chlorinated polyvinylchloride (CPVC), PEX, and polybutylene.

The system also comprises one or more temperature sensors. In some embodiments, the temperature sensors include a heat-absorbing solution temperature sensor. Preferably, the heat-absorbing solution temperature sensor is located in, attached to, or disposed upon the heat-absorbing solution basin and measures the temperature of the heat-absorbing solution located in the heat-absorbing solution basin. In some embodiments, the temperature sensors include a distillation cooling coil temperature sensor. In some embodiments, the distillation cooling coil temperature sensor is located in, attached to, or disposed upon the distillation cooling coil and measures the temperature of coolant flowing through the distillation cooling coil. In some embodiments, the temperature sensors include a distillate temperature sensor. In some embodiments, the distillate temperature sensor is located in, attached to, or disposed upon the distillate collector. In alternative embodiments, the distillate temperature sensor is located in, attached to, or disposed upon the distillate receptacle. The distillate temperature sensor measures the temperature of distillate produced by the system. In some embodiments, the temperature sensors include a heat exchange coil temperature sensor. Preferably, the heat exchange coil temperature sensor is located in, attached to, or disposed upon the distillation cooling coil and measures the temperature of coolant flowing through the heat exchange coil. In some embodiments, the temperature sensors include a compressor inlet temperature sensor. Preferably, the compressor inlet temperature sensor is located in, attached to, or disposed upon the compressor inlet and measures the temperature of coolant flowing into the compressor. In some embodiments, the temperature sensors include a compressor outlet temperature sensor. Preferably, the compressor outlet temperature is located in, attached to, or disposed upon the compressor outlet and measured the temperature of coolant flowing out of the compressor. In some embodiments, the temperature sensors include a secondary cooling coil temperature sensor. Preferably, the secondary cooling coil temperature sensor is located in, attached to, or disposed upon the secondary cooling coil and measures the temperature of coolant flowing through the secondary cooling coil. In some embodiments, the temperature sensors include a structure or appliance temperature sensor. Preferably, the structure or appliance temperature sensor is located in, attached to, or disposed upon the structure or appliance cooled by the system and measures the temperature of the structure or appliance cooled by the system. In some embodiments, the temperature sensors include an expansion valve inlet temperature sensor. Preferably, the expansion valve inlet temperature sensor is located in, attached to, or disposed upon the expansion valve inlet and measures the temperature of coolant flowing into the expansion valve inlet. In some embodiments, the temperature sensors include an expansion valve distillation cooling coil temperature sensor. Preferably, the expansion valve distillation cooling coil outlet temperature sensor is located in, attached to, or disposed upon the expansion valve distillation cooling coil outlet and measures the temperature of coolant flowing through the expansion valve distillation cooling coil outlet. In some embodiments, the temperature sensors include an expansion valve secondary cooling coil temperature sensor. Preferably, the expansion valve secondary cooling coil outlet temperature sensor is located in, attached to, or disposed upon the expansion valve secondary cooling coil outlet and measures the temperature of coolant flowing through the expansion valve secondary cooling coil outlet. In some embodiments, the temperature sensors include a coolant bypass temperature sensor. Preferably the coolant bypass temperature sensor is located in, attached to, or disposed upon the coolant bypass and measures the temperature of coolant flowing through the coolant bypass. In some embodiments, the temperature sensors include an ambient temperature sensor. This ambient temperature sensor measures the ambient temperature around the exterior of the system. In some embodiments, the ambient temperature sensor is attached to or disposed upon a part of the system, e.g. the transparent inclined top cover, the heat-absorbing solution basin, a solar collector, the distillate receptacle, the exterior of a structure cooled by the system, or some other part of the system. In alternative embodiments, the ambient temperature sensor is free-standing.

In some embodiments, the system further comprises ambient weather sensors. These ambient weather sensors provide current weather inputs to the controller. The current weather inputs provide additional information about the current weather conditions that can affect the performance of the system. Examples of such weather conditions include, but are not limited to ambient humidity, intensity of solar radiation, wind speed, and barometric pressure. In some embodiments, the ambient weather sensors include at least one humidity sensor. The humidity sensor may be an absolute humidity sensor or a relative humidity sensor. In some embodiments with multiple humidity sensors, any combination of absolute humidity sensors and relative humidity sensors may be used. Examples of humidity sensors include capacitive humidity sensors, resistive humidity sensors, and thermal conductivity humidity sensors. In some embodiments, the ambient humidity sensor is attached to or disposed upon a part of the system, e.g. the transparent inclined top cover, the heat-absorbing solution basin, a solar collector, the distillate receptacle, the exterior of a structure cooled by the system, or some other part of the system. In alternative embodiments, the ambient humidity sensor is free-standing. In some embodiments, the ambient weather sensors include at least one solar radiation intensity sensor. The solar radiation intensity sensor measures the current intensity of solar radiation. Examples of solar radiation intensity sensors include, but are not limited to, photoelectric detectors such as photomultiplier tubes, phototubes, and microchannel plate detectors, semiconductor detectors such as charge-coupled device (CCD) detectors, photoresistors, phototransistors, and photodiodes, photovoltaic (solar cell) detectors, and thermal detectors such as bolometers, pyroelectric detectors, and thermopiles. In some embodiments, the solar radiation intensity sensor is attached to or disposed upon a part of the system, e.g. the transparent inclined top cover, the heat-absorbing solution basin, a solar collector, the distillate receptacle, the exterior of a structure cooled by the system, or some other part of the system. In alternative embodiments, the solar radiation intensity sensor is free-standing. In some embodiments, the ambient weather sensors include at least one wind speed detector, also known as an anemometer. Examples of wind speed detectors (anemometers) include, but are not limited to mechanical anemometers, thermal anemometers, pressure tube anemometers, sound wave anemometers, ultrasonic anemometers, laser anemometers, and Doppler radar anemometers. In some embodiments, the wind speed detector also measures wind direction. In some embodiments, the wind speed sensor is attached to or disposed upon a part of the system, e.g. the transparent inclined top cover, the heat-absorbing solution basin, a solar collector, the distillate receptacle, the exterior of a structure cooled by the system, or some other part of the system. In alternative embodiments, the wind speed sensor is free-standing. In some embodiments, the ambient weather sensors include at least one barometric pressure sensor. Examples of barometric pressure sensors include, but are not limited to piezoelectric barometers, capacitive barometers, and resistive barometers. In some embodiments, the barometric pressure sensor is attached to or disposed upon a part of the system, e.g. the transparent inclined top cover, the heat-absorbing solution basin, a solar collector, the distillate receptacle, the exterior of a structure cooled by the system, or some other part of the system. In alternative embodiments, the barometric pressure sensor is free-standing.

The controller is connected to the temperature sensors, the distillate flow sensor, the compressor, and the expansion valve. In some embodiments, the controller provides outputs to control an amount of coolant that is flowed through the distillation coil. In some embodiments, the controller provides outputs to control an amount of coolant that is flowed through the secondary cooling coil. In some embodiments, the controller provides outputs to control an amount of coolant that is flowed through the coolant bypass. In some embodiments, the controller provides outputs that control a ratio of the amount of coolant that is flowed through the distillation cooling coil to the amount of coolant that is flowed through the secondary cooling coil. In some embodiments, the controller provides outputs that control a ratio of the amount of coolant that is flowed through the distillation cooling coil to the amount of coolant that is flowed through the coolant bypass. In some embodiments, the controller provides outputs that control a ratio of the amount of coolant that is flowed through the secondary cooling coils to the amount of coolant that is flowed through the coolant bypass. In some embodiments, the controllers controls the aforementioned ratio of the amount of coolant that is flowed through the distillation cooling coil to the amount of coolant that is flowed through the secondary cooling coil by operating the action of the expansion valve. In some embodiments, the controller controls the aforementioned ratio of the amount of coolant that is flowed through the distillation cooling coil to the amount of coolant that is flowed through the coolant bypass by operating the action of the expansion valve. In some embodiments, the controller controls the aforementioned ratio of the amount of coolant that is flowed through the secondary cooling coil to the amount of coolant that is flowed through the coolant bypass by operating the action of the expansion valve. In some embodiments, the controller provides an output to control the activity of the compressor.

In some embodiments, the controller is capable of retaining a history of inputs and outputs. In some embodiments, the controller is equipped with an internal or external memory that allows it to retain the aforementioned history of inputs and outputs. In some embodiments, the aforementioned inputs come from the plurality of temperature sensors, the distillate flow sensor, the compressor, the expansion valve, and/or the ambient weather sensors. In some embodiments, the history of inputs and outputs is used by the controller to influence the current outputs of the controller. In some embodiments, the controller is capable of predicting future outputs. In some embodiments, the controller is capable of predicting future outputs based on the inputs. In some embodiments, the controller is capable of predicting the future outputs based on the history of inputs and outputs. In some embodiments, these capabilities are accomplished by measuring, fitting, calculating, or estimating parameters of heat losses and heat gains of various components of the system such as the solar still and the structure or appliance. In some embodiments, the parameters of heat losses and heat gains include a heat loss coefficient of the solar still during periods of low solar light or heat input. In some embodiments, the parameters of heat losses and heat gains include a heat gain coefficient of the solar still during periods of normal solar light or heat input. In some embodiments, the parameters of heat losses and heat gains include a heat loss coefficient of the structure or appliance during periods of low solar light or heat input. In some embodiments, the parameters of heat losses and heat gains include a heat gain coefficient of the structure or appliance during periods of normal solar light or heat input. These parameters can be used to estimate the temperature of the solar still or structure or appliance by, for example, calculating heat inputs and heat outputs as a function of time. In some embodiments, the controller calculates the solar heat input into the solar still or structure or appliance using the appropriate heat gain coefficient and the current solar radiation intensity. In some embodiments, the controller calculates the heat output of the solar still or structure or appliance using the appropriate heat loss coefficient and the current ambient weather conditions such as wind speed, ambient temperature, and ambient humidity.

In some embodiments, the controller is capable of providing the structure or appliance with a structure temperature or an appliance temperature. In some embodiments, the structure temperature or appliance temperature is able to be selected. In some embodiments, the structure temperature or appliance temperature is selected by the input of a structure temperature setpoint or an appliance temperature setpoint. In some embodiments, the system is capable of maintaining the structure temperature or appliance temperature to within 5° C., preferably 4.5° C., preferably 4° C., preferably 3.5° C., preferably 3° C., preferably 2.5° C., preferably 2° C., preferably 1.5° C., preferably 1.25° C., preferably 1° C., preferably 0.75° C., preferably 0.5° C. of the structure temperature setpoint or appliance temperature setpoint.

In some embodiments, the solar distillation system produces a distillate when supplied with solar light or heat input. In some embodiments, the solar distillation system produces a distillate when not supplied with solar light or heat input. In some embodiments, the solar distillation system produces a distillate during hours of standard solar light or heat input. In some embodiments, the solar distillation system also produces a distillate during hours of low solar light or heat input. In some embodiments, the solar distillation system also produces a distillate during hours of reduced solar light or heat input.

Hours of daytime between sunrise and sunset may be considered hours of standard solar light or heat input. Hours of nighttime may be considered hours of low solar light or heat input. Dawn and/or dusk may be considered hours of low solar light or heat input. Dawn and/or dusk may alternatively be considered hours of reduced solar light or heat input. As used herein, the term "dawn" refers to a twilight period before sunrise. As used herein, the term "dusk" refers to a twilight period after sunset. Twilight refers to periods of time during which the sun illuminates the portion of the earth experiencing twilight but the sun is below the horizon. The illumination is provided primarily by scattered and/or reflected and/or refracted light from the interaction between the light from the sun and the atmosphere of the earth. Twilight is commonly divided into three distinct periods based on the angular distance between the geometric center of the disk of the sun and the horizon. Civil twilight refers to the period of twilight when the aforementioned angular distance is 6° or less. Nautical twilight refers to the period of twilight when the aforementioned angular distance is 12° or less. Astronomical twilight refers to the period of twilight when the aforementioned angular distance is 18° or less. Based on these definitions, both a portion of astronomical twilight and a portion of nautical twilight overlap with the entirety of civil twilight, and a portion of astronomical twilight overlaps with the entirety of nautical twilight.

In some embodiments, the system produces distillate at an hourly distillate production rate that is dependent upon the current solar heat input. In some embodiments, the system produces distillate at an hourly distillate production rate that is dependent on the current and 1 to 2 previous hours of solar heat input. In some embodiments, the system produces distillate at an hourly distillate production rate during hours of standard solar light or heat input of 0.1 to 1.5 liters per hour, preferably 0.15 to 1.25 liters per hour, preferably 0.2 to 1.1 liters per hour, preferably 0.25 to 1.0 liters per hour, preferably 0.3 to 0.9 liters per hour per square meter of area exposed to solar radiation. In some embodiments, the system produces distillate at an hourly distillate production rate during hours of low solar light or heat input which is 50 to 100%, preferably 55 to 95%, preferably 60 to 90%, preferably 65 to 85%, preferably 70 to 80% of the hourly distillate production rate during hours of standard solar light or heat input. In some embodiments, the system produces distillate at an hourly distillate production rate during hours of reduced solar light or heat input which is 50 to 100%, preferably 55 to 95%, preferably 60 to 90%, preferably 65 to 85%, preferably 70 to 80% of the hourly distillate production rate during hours of standard solar light or heat input.

In some embodiments, the use of the compressor has the effect of minimizing or lessening a difference in hourly distillate production rates between hours of standard solar light or heat input and hours of low or reduced solar light or heat input. It is advantageous to continue producing distillate and providing cooling to the structure or appliance during hours of low or reduced solar light or heat input. In some embodiments, the controller provides outputs to optimize, maximize, or stabilize the hourly distillate production rate. In some embodiments, the controller provides outputs to optimize, maximize, or stabilize the structure or appliance temperature over a period of hours. In some embodiments, the optimizing, maximizing, or stabilizing the hourly distillate production rate and/or structure or appliance temperature minimizes or lessens the difference in hourly distillate production rates between hours of standard solar light or heat input and hours of low or reduced solar light or heat input. In some embodiments, the aforementioned outputs are based on the controller inputs. In some embodiments, the aforementioned outputs are based on the history of inputs and outputs.

The level of solar light or heat input available during hours of standard solar light or heat input may be affected by factors such as the location of the solar distillation system, the weather, and the season. Inclement weather, for example, may reduce the level of solar light or heat input available during daytime.

Seasonal variability may raise or lower the level of solar light or heat input available. Differences in the length of day between winter and summer will provide lower daily or weekly distillate production rates in winter when compared with summer. Further, the lower intensity of solar radiation reaching the surface of the Earth per unit area will provide lower hourly, daily, or weekly distillate production rates in winter when compared with summer. The components of the solar distillation system which may be advantageous for reducing the difference between the hourly distillate production rate during hours of low solar light or heat input and the hourly distillate production rate during hours of standard solar light or heat input may also be advantageous for reducing the difference between the daily or weekly distillate production rate during days or weeks of low solar light or heat input (i.e. winter time) and the daily or weekly distillate production rate during days or weeks of standard solar light or heat input (i.e. summertime). Examples of such components include the controller, expansion valve, the compressor, and the secondary cooling coil.

In some embodiments, the system produces distillate at a weekly distillate production rate during days or weeks of low solar light or heat input which is 50 to 100%, preferably 55 to 95%, preferably 60 to 90%, preferably 65 to 85%, preferably 70 to 80% of the weekly distillate production rate during days or weeks of standard solar light or heat input.

In some embodiments, the use of the compressor has the effect of minimizing or lessening a difference in weekly distillate production rates between days or weeks of standard solar light or heat input and days or weeks of low solar light or heat input. It is advantageous to continue producing distillate and providing cooling to the structure or appliance during weeks of low or reduced solar light or heat input. In some embodiments, the controller provides outputs to optimize, maximize, or stabilize the weekly distillate production rate. In some embodiments, the controller provides outputs to optimize, maximize, or stabilize the structure or appliance temperature over a period of days or weeks. In some embodiments, the optimizing, maximizing, or stabilizing the weekly distillate production rate and/or structure or appliance temperature minimizes or lessens the difference in weekly distillate production rates between days or weeks of standard solar light or heat input and days or weeks of low or reduced solar light or heat input. In some embodiments, the aforementioned outputs are based on the controller inputs. In some embodiments, the aforementioned outputs are based on the history of inputs and outputs.

The present disclosure also relates to a method of producing a distillate using the solar distillation system described above. The method comprises exposing the heat-absorbing solution to sunlight and collecting the distillate. In some embodiments, the method also provides cooling for a structure or appliance. In some embodiments, the method produces distillate at an hourly distillate production rate as described above. In some embodiments, the method produces distillate at a daily or weekly distillate production rate as described above. In some embodiments, the method provides a structure with a structure temperature as described above. In some embodiments, the method provides an appliance with an appliance temperature as described above.

The examples below are intended to further illustrate protocols for and are not intended to limit the scope of the claims.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

The present invention is a hybrid solar distillation unit combining a unique refrigeration system with a traditional solar distillation still and a residential house. The hybrid solar still included a heat-absorbing saline water basin, transparent inclined top covers and side walls. The heating coil of the refrigeration system was submerged into the heat-absorbing saline contained in the heat-absorbing saline water basin. A network of cooling coils was established for the refrigeration system wherein one cooling coil was attached inside the residential house and the second cooling coil was attached to the top inclined cover of the solar still. A 3-way expansion valve was used to control and regulate the flow of refrigerant to both the cooling coils. The sea water was fed into the water basin and was vaporized by two sources of heat; i.e. the solar energy transmitted through the top covers and the heat added by the heating coil. The condensed vapor (distillate) on the inner side of the refrigerated top covers flowed down into a hollow channel for distillate collection. The hybrid distillation system is low cost, energy efficient, and sustainable to fulfill the daily drinking water requirements of one household.

The productivity of a stand-alone traditional solar still is low around 4 liters per square meters per day during summer while in winter the yield is lower around 2.5 liters per square meters per day. Further, the hourly distillate production rate fluctuates all through the day depending on the availability of solar radiation. The present invention was used to deliver a constant desirable hourly distillate all through the day and night by utilizing the hybrid system actuated with a smart controller. Moreover, the cooling requirement of a residential house was met alongside the operation of solar distillation unit.

The microcontroller was supplied with inputs related to the load in the residential house as well as the demand for distillate. The inputs were the desired temperature of the house, the actual temperature of the house, desired distillate flow, actual distillate flow. The microcontroller was used to calculate the total required cooling load (coils 1 and 3) as well as required heating load in coil 2, and was used to stage the compressor accordingly. The controller was also used to regulate the 3-way valve based on the cooling and heating load.

The controller had predictive capability based on the historical ambient temperature and humidity, as well as distill historical demand. The controller can proactively stage the compressor and the 3-way valve to supply the adequate cooling and heating load.

The invention claimed is:

1. A solar distillation system for producing a distillate, comprising:
    a solar still comprising:
        a heat-absorbing solution,
        a heat-absorbing solution basin,
        a transparent, inclined top cover attached to the heat-absorbing solution basin,
        a distillate collector,
        a distillate receptacle,
        a distillate flow sensor connected to the distillate collector or the distillate receptacle,
        a coolant,
        a heat exchange coil located in the heat-absorbing solution basin comprising a heat exchange coil inlet and heat exchange coil outlet,
        a distillation cooling coil located in or disposed on the transparent, inclined top cover comprising a distillation cooling coil inlet and a distillation cooling coil outlet;
    an expansion valve comprising:
        an expansion valve inlet connected to and located downstream of the heat exchange coil outlet,
        an expansion valve distillation cooling coil outlet connected to and located upstream of the distillation cooling coil inlet, and
        an expansion valve secondary cooling coil outlet;
    a secondary cooling coil comprising a secondary cooling coil inlet connected to and located downstream of the expansion valve secondary cooling coil outlet and a secondary cooling coil outlet;
    a compressor comprising a compressor inlet connected to and located downstream of the distillation cooling coil outlet and the secondary cooling coil outlet and a compressor outlet connected to and located upstream of the heat exchange coil inlet;
    a one or more temperature sensors; and
    a controller connected to the temperature sensors, the distillate flow sensor, the compressor, and the expansion valve;
    wherein the heat exchange coil, the expansion valve, the distillation cooling coil, the secondary cooling coil, and the compressor are fluidly connected such that the coolant flows from the compressor through the heat exchange coil to the expansion valve where it is flowed through either the distillation cooling coil back to the compressor or the secondary cooling coil back to the compressor without the coolant mixing with the distillate or the heat-absorbing solution; and
    wherein the controller receives inputs from the temperature sensors and the distillate flow sensor and provides outputs to control an amount of coolant that is flowed through the distillation cooling coil and an amount of coolant that is flowed through the secondary cooling coil, and an activity of the compressor.

2. The system of claim 1, wherein the heat-absorbing solution is a saline water.

3. The system of claim 1, wherein the distillate is freshwater.

4. The system of claim 1, wherein the expansion valve is a three-way valve.

5. The system of claim 4, wherein the three-way valve regulates the amount of coolant that is flowed through the secondary cooling coil and the amount of coolant that is flowed through the distillation cooling coil based on the outputs provided by the controller.

6. The system of claim 1, wherein the controller controls the amount of coolant that is flowed through the distillation cooling coil and the amount of coolant that is flowed through the secondary cooling coil and an activity of the compressor by operating the action of the expansion valve.

7. The system of claim 1, wherein the controller controls the amount of coolant that is flowed through the distillation cooling coil and the amount of coolant that is flowed through the secondary cooling coil and an activity of the compressor by operating the action of the compressor.

8. The system of claim 1, further comprising ambient weather sensors which provide current weather inputs to the controller.

9. The system of claim 1, wherein the controller is capable of retaining a history of inputs and outputs.

10. The system of claim 9, wherein the controller is capable of predicting future outputs based on the history of inputs and outputs.

11. The system of claim 1, wherein the secondary cooling coil is configured to provide cooling for a structure or appliance.

12. The system of claim 11, wherein the structure or appliance is equipped with at least one of the temperature sensors connected to the controller.

13. The system of claim 12, wherein the controller is capable of providing the structure or appliance with a structure temperature or appliance temperature that is selected by an input of a structure temperature setpoint or appliance temperature setpoint.

14. The system of claim 13, wherein the system is capable of maintaining the structure temperature or appliance temperature to within 5° C. of the structure temperature setpoint or appliance temperature setpoint.

15. The system of claim 1, wherein the system produces distillate at an hourly distillate production rate during hours of low solar light or heat input and/or nighttime operation which is 50 to 100% of an hourly distillate production rate during hours of standard solar light or heat input and/or daytime.

16. The system of claim 1, wherein the system produces distillate at a weekly distillate production rate during weeks of low solar light or heat input and/or wintertime operation which is 50 to 100% of a weekly distillate production rate during weeks of standard solar light or heat input and/or summertime.

17. A method of producing a distillate using the system of claim 1, the method comprising exposing the heat-absorbing solution to sunlight and collecting the distillate.

18. The method of claim 17, further comprising cooling a structure or appliance via the secondary cooling coil.

* * * * *